US005203283A

United States Patent [19]

Nagamori et al.

[11] Patent Number: 5,203,283

[45] Date of Patent: Apr. 20, 1993

[54] METHOD AND APPARATUS FOR RAISING RUMINANTS

[75] Inventors: Syotaro Nagamori, Kyota; Yasuyuki Takada, Tokyo, both of Japan

[73] Assignee: Meiwa Sangyo Co., Ltd., Kyoto, Japan

[21] Appl. No.: 776,629

[22] Filed: Oct. 15, 1991

[51] Int. Cl.[5] .......................... A01K 1/00; A01K 3/00

[52] U.S. Cl. .......................... 119/174

[58] Field of Search .......................... 119/174; 132/262

[56] References Cited

U.S. PATENT DOCUMENTS

| | | | |
|---|---|---|---|
| 3,294,099 | 12/1966 | Warthen et al. | 132/39 |
| 3,415,225 | 12/1968 | Collier | 119/174 |
| 3,548,785 | 12/1970 | Cooper | 119/174 |
| 3,696,787 | 10/1972 | Cooper | 119/174 |
| 4,112,069 | 9/1978 | Huber | 119/174 X |
| 4,981,105 | 1/1991 | Petersen | 119/174 |

FOREIGN PATENT DOCUMENTS

| | | | |
|---|---|---|---|
| 2155335 | 9/1985 | United Kingdom | 119/174 |

*Primary Examiner*—John G. Weiss
*Assistant Examiner*—Nicholas D. Lucchesi
*Attorney, Agent, or Firm*—Oldham, Oldham & Wilson Co.

[57] ABSTRACT

A gastric resident object having elastic stimulus members, which is admitted into the rumen, functions as a substitute for roughage and stimulates the mucous membrane and the wall of the rumen, so that the rumen can be maintained healthily and appropriately. Thus, it is possible to the use of roughage in quantity and decrease excretion, to thereby curtail the costs for dealing with the excretion and feeding for the ruminants.

6 Claims, 5 Drawing Sheets

METHOD AND APPARATUS FOR RAISING RUMINANTS

BACKGROUND OF THE INVENTION

This invention relates to a method and apparatus for raising ruminants.

Taking into consideration the present circumstances such that cattle-raising in a pasture becomes increasingly difficult, the business of raising and trading cattle would not pay without controlling completely the system of raising the cattle. For raising the cattle in a rational manner, livestock feed for cattle is the most important.

The feed for cattle fundamentally is roughage and concentrate as enumerated below:

Concentrate with high digestible nourishment in total amount (TDN): Corn, barley, wheat, soybean, soybean cake, and feed rice.

Concentrate rich in starchiness: Corn, barley, wheat, and oats.

Concentrate rich in fiber: Beet pulp, cotton seed, barley bran, soybean skin, and beer lees.

Concentrate rich in vegetable fat: Cotton seed, soybean, and rice bran.

Concentrate rich in protein: Soybean cake, linseed lees, cotton-seed lees, peanut shell, etc.

Typical roughage: Wild plants, dry pasture, hay cube, various kinds of silage, and paddy straw.

The type of feed to be supplied to the cattle and the method of raising the cattle would depend upon the type of the cattle which are classified into, for instance, dairy cattle and beef cattle and other classifications which can be further subdivided.

Thus, there are a variety of methods of raising the cattle. Even in the case of raising the dairy cattle, the raising method must be changed with the stage of growing. For example, the raising method for the cattle of an early age is different from that for matured cattle. Also, it is necessary to consider various plans for raising the cattle according to the growth conditions of raising the cattle or upbringing the cattle in lactation. That is, the plan designed for raising the cattle should be carried out with knowledge whether the cattle are in the preceding or latter period of the fattening stage and by letting the cattle have the aforesaid feed in combination and in accordance with the desire purpose. The raising method for cattle using the concentrate feed as noted above is now being automatically carried out in a mechanized manner. However, the raising method using the aforenoted roughage feed cannot easily be practiced automatically in a mechanized manner. The roughage feed calls for a large storage space.

The concentrate feed applied in raising the cattle is thus handled and controlled with ease. Since the roughage, feed exerts a great influence upon the rumen (first compartment of the cattle's stomach) which is regarded as one of important factors in raising, feeding of the roughage to the cattle is required to be controlled with the greatest possible care.

This is because the roughage being supplied to the cattle affects directly fermentation in the rumen of the cattle, since the rumen of the cattle does not per se secrete digestive enzymes and the composition of feed swallowed into the rumen is decomposed and composed by bacilli and protozoa in the rumen. The starch, roughage and sugar in the feed are first decomposed to yield volatile fatty acid (VFA), involving the propagation of bacteria, which is the essential component of the physical energy of the cattle. At the same time, the protein and non-protein nitrogen are decomposed into ammonia to compose bacterial protein and propagate protozoa which gives birth to protozoa protein. These resultant components contribute to the yield of lacto-Protein and beef protein.

Tallow is formed by decomposing the fat in the feed to yield fatty acid and glycerol and denaturing the glycerol thus yielded to propionic acid. Furthermore, unsaturated fatty acid is saturated to obtain saturated fatty acid.

To effectively promote the fermentation in the rumen, the roughage necessitates rough-stiffness and bulkiness for stimulating the mucous membrane of the rumen. Thus, the physical properties of the roughage accelerates the rumination and activity of the rumen.

The rumination involves secreting saliva, thereby to maintain the pH concentration in the rumen at a fixed value by sodium bicarbonate contained in the saliva.

If the physical properties of the roughage are weak, the activity of rumen becomes dull and the rumination is lessened thereby weakening the secretion of saliva and lowering the ph concentration in the rumen, with the result that the bacilli and protozoa in the rumen are affected adversely.

On the other hand, ketosis, milk fever and postpartum stagnation are apt to be caused by abnormal fermentation, indigestion due to displacement of the abomasum and the like before or after delivery. Therefore, it is remarkably important to let the cattle have the roughage feed more than one-third the total amount of dry feed and not less than 1.5% of the weight of the cattle. A standard crude fiber rate representing the content of crude fiber in the fatting feed would be at least 9% for fattening cattle, 15% to 17% for lactating cattle, and 25% at a maximum for grownup cattle.

However, from the standpoint of nutrition, the components having the aforementioned physical properties of the roughage feed could not be replaced with any other substitute feed, although the concentrate components such as cellulose, protein and mineral contained in the roughage can be substituted for other possible feed. Thus, there has been so far proposed a method in which cut pieces of vinyl chloride fiber are used instead of the components having the physical properties of the roughage Though such substitute has sufficiently the desired physical function of the roughage, excrement is increased in amount because the vinyl chloride fiber is finely hashed due to rumination. Besides, since the vinyl choloride fiber in the excrement is irresoluble in the earth, it is difficult to deal with such irresoluble components in the excrement. Accordingly, the vinyl fiber as the substitute for the roughage cannot be used practically.

Compared with the concentrate feed, the roughage which is one and half times in unit price ratio in kind and three times in digestible nourishment is expensive. Moreover, the cattle weighing 500kg generally evacuates about 60kg of excrement including 52kg solid wastes and 8kg liquid wastes. The non-digested roughage in the solid wastes comes up to 4kg to 5kg. As a result, an increase in quantity of fibrous feed causes the excrement to be increased, and therefore, the work of disposing the excrement often becomes onerous.

In a case that the crude fiber rate in the roughage is too high, energy intake per unit is reduced, to thereby restrict a possibility of heightening nutritive value resulting in less productivity of raising cattle. On the contrary, low crude fiber rate would entail a problem such as a difficulty in digestion and decrease in milk fat, and the appropriate quantity of the roughage cannot be readily determined.

As a method for eliminating the problem noted above, there has been known the so-called detergent method for analyzing feed. In this method, neutral detergent participating in bulkiness and intussusception is analyzed into its insoluble matter (NDF), and acid detergent participating in digestiblity is analyzed into its soluble matter (ADF). It was reported that the ADF content is required to be more than 19% relative to the milk component in order to prevent the milk from being lowered in fat, and the fat in milk is most increased at the NDF content over about 35%. In addition, it has been suggested that 75% of the NDF component in the feed be contributed by the roughage.

As is obvious from the foregoing, the feeding of roughage is remarkably difficult technically.

OBJECT AND SUMMARY OF THE INVENTION

An object of the present invention is to provide a ruminant raising method and apparatus capable of automatically performing the work of feeding roughage to cattle in a mechanized manner.

To attain the object described above according to this invention, there is provided a method for raising ruminants, which comprises placing in the stomach at least one gastric resident object having a small diameter before being admitted and elastic stimulus members which is to adopted to expand in the stomach so as to prevent the gastric resident object from being discharged from the stomach. The gastric resident object is constructed to have stimulus members adopted to move about in the stomach, giving a stimulus to the walls of the stomach, so as to serve as a substitute for the physical properties of roughage.

This invention further provides an apparatus for raising ruminants, comprising a gastric resident object having elastic stimulus members which are wrapped to a small diameter with a wrapping member soluble or separable so as to allow the stimulus members to be expanded in the stomach.

By staying the gastric resident object which serves as a substitute for the physical properties of roughage in the ruminant stomach, the mucous membrane of the rumen can be maintained healthy and appropriately, and the use of roughage can be lessened in quantity or would become unnecessary. As a result, since the excretion of the ruminants can be decreased, it becomes possible to curtail the cost for dealing with the excretion.

In addition, the gastric resident object to be positioned in the ruminant stomach can be produced at a low price in comparison with the roughage, and therefore, the cost for feeding for the ruminants can be kept down.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 1:
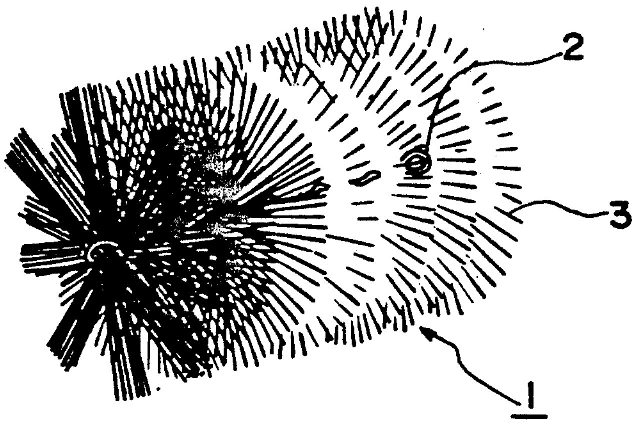
FIG. 1 is a perspective view showing a gastric resident object, in its spread state, of one embodiment according to this invention.
Figure 2:
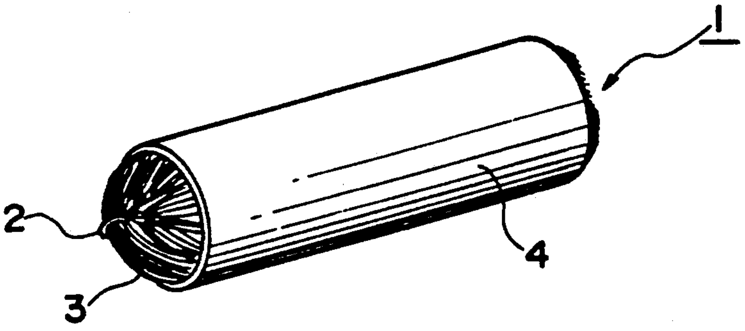
FIG. 2 is a perspective view showing the gastric resident object wrapped by a wrapping means of the same.
Figure 3:
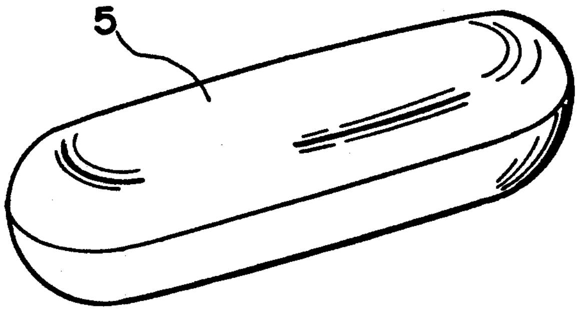
FIG. 3 is a perspective view showing the gastric resident object contained in a capsule of the same.
Figure 4:
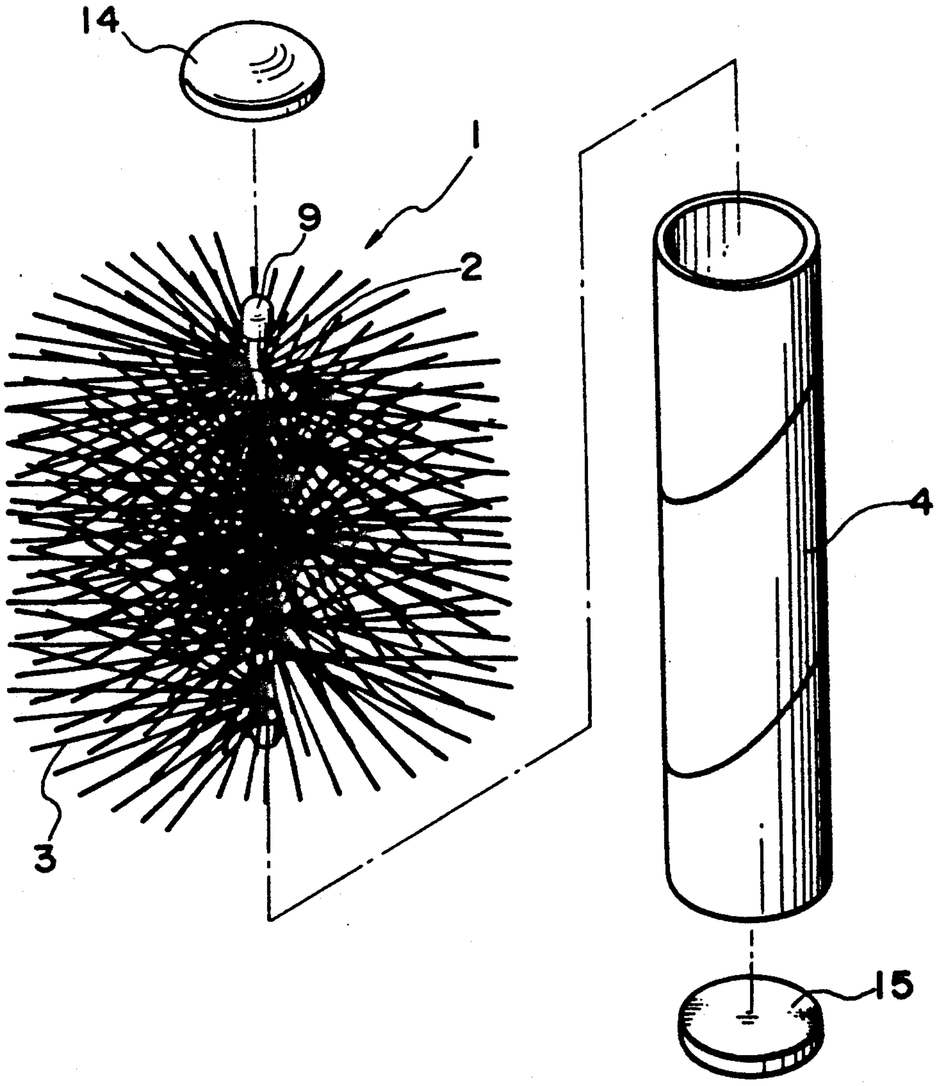
FIG. 4 is a perspective view of another embodiment according to this invention
Figure 5:
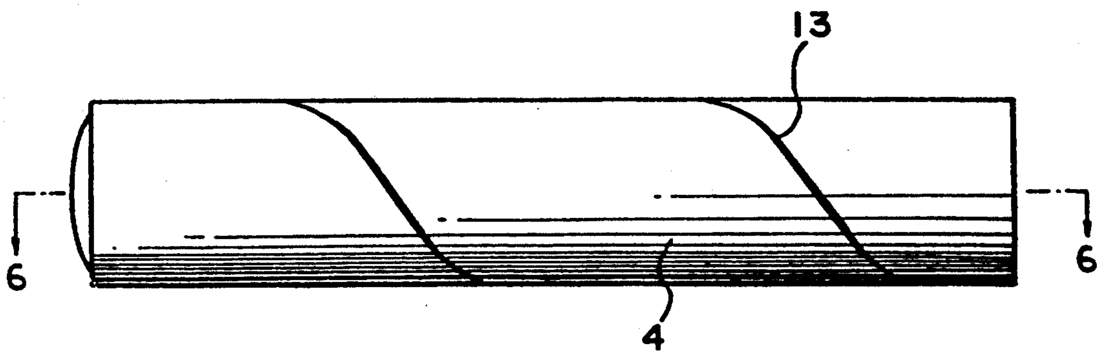
FIG. 5 is a front view of FIG. 4.
Figure 6:
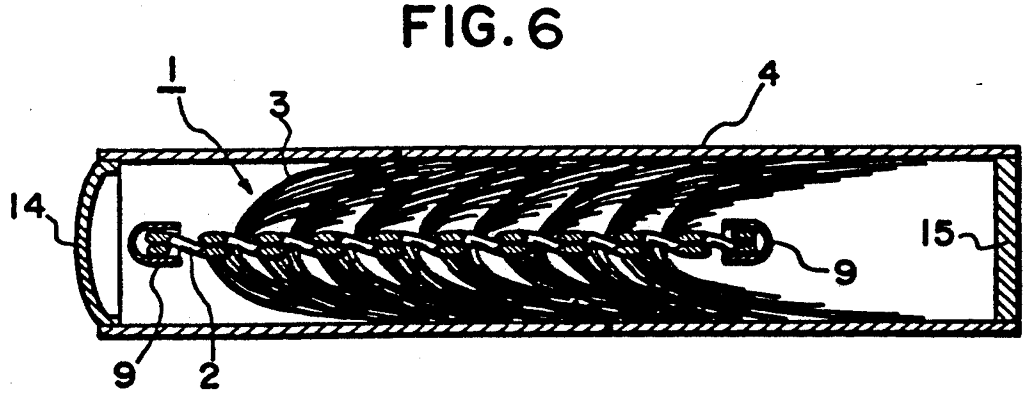
FIG. 6 is a longitudinal section of FIG. 4.

The present invention will become more fully understood from the detailed description given hereinbelow and the accompanying drawings which are given by way of illustration only.

Reference numeral 1 denotes a gastric resident object to be admitted into the stomach of a ruminant such as cattle. The gastric resident object 1 comprises a tying wire 2 and slender pieces 3 which are bunched densely in the form of a brush by the tying wire 2 and serve as stimulus members. The slender pieces 3 are made of synthetic resin having stability and elasticity. The tying wire 2 is folded double so as to nip the slender pieces 3. The double-folded wire 2 is provided at either end thereof with a cap 9. The slender pieces 3 may be formed of natural fiber. Also, in place of the wire 2, a synthetic resin core or expansible synthetic resin rod may be used in such a state that the slender pieces of natural fiber are radially secured so as to protrude from the core or rod. Otherwise, the tying wire 2 may be made of shape memory alloy or shape memory resin so that the slender pieces bunched by the tying wire 2 are spread into the shape of a sphere or like a scrubbing brush (annular shaped brush) in the rumen.

The bunch which is formed by securing the aforesaid slender pieces 3 of synthetic resin or natural fiber radially around the tying wire 2 or the like is required to have such an outer diameter that, once the gastric resident object 1 comes into the rumen through the esophageal orifice of the stomach, it can neither return to the gullet nor move forward into the psalterium (third compartment of the ruminant stomach). Thus, the gastric resident object 1 is desired to have a diameter of 12 cm or more and a length of 12 cm or less. The bunch of slender pieces 3 such as of synthetic resin are tightly wrapped to a small diameter by a wrapping member 4 made of paper, thin film shaped in a tape, yarn, adhesive or the like. The wrapping member 4 is formed in a cylindrical shape, so that the bunch of slender pieces 3 can be inserted thereinto in its pursed state. The gastric resident object 1 may be provided at both its ends with lids 14 and 15. It is preferable to form the wrapping member 4 by spirally winding a tape of paper around the bunch of slender pieces 3. The wrapping member 4 or paper can be easily removed by tearing off the paper from the butting joint part 13.

Otherwise, it is desirable to contain the bunch of slender pieces 3 in a capsule 5 made of a soluble substance such as an ice cream cone. In this case, the gastric resident object 1 may be formed by containing, in the soluble capsule 5, the bunch of slender pieces 3 wrapped tightly with the wrapping member 4 such as paper or thin film.

Though the wrapping member 4 such as of paper is desired to be soluble in the rumen as touched upon above, glued joint portions at which the paper is adhered to form the wrapping member around the bunch of slender pieces 3 may be dissolved in the rumen. Additionally, there may be used soluble yarn such as Solublon.

The bunch of slender pieces 3 wrapped tightly to a small diameter is desired to have a diameter of 3 cm or less.

Figure 7:
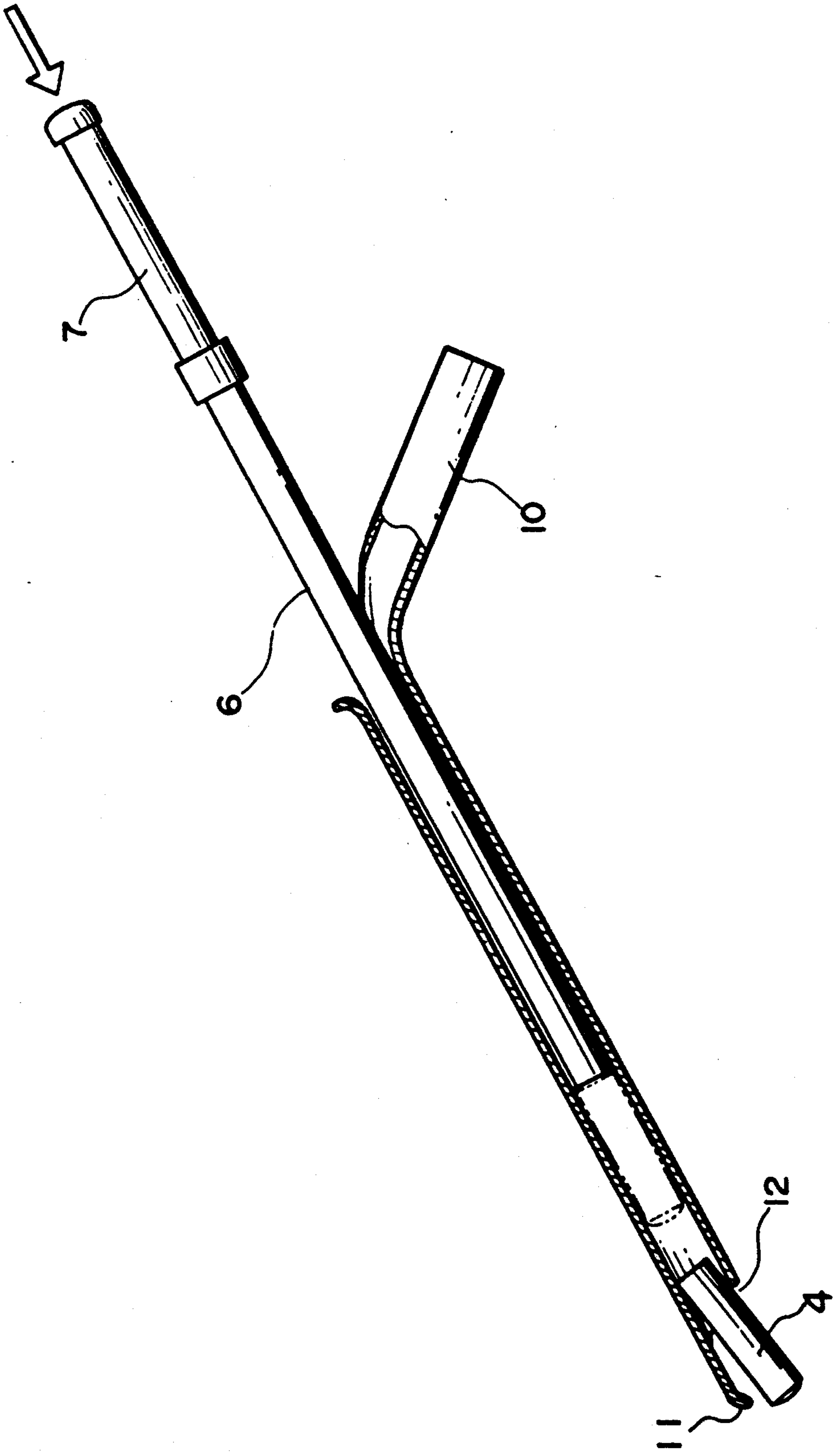
FIG. 7 is a longitudinal section of a tube by which the gastric resident object according to this invention is admitted into the stomach.
Figure 8:
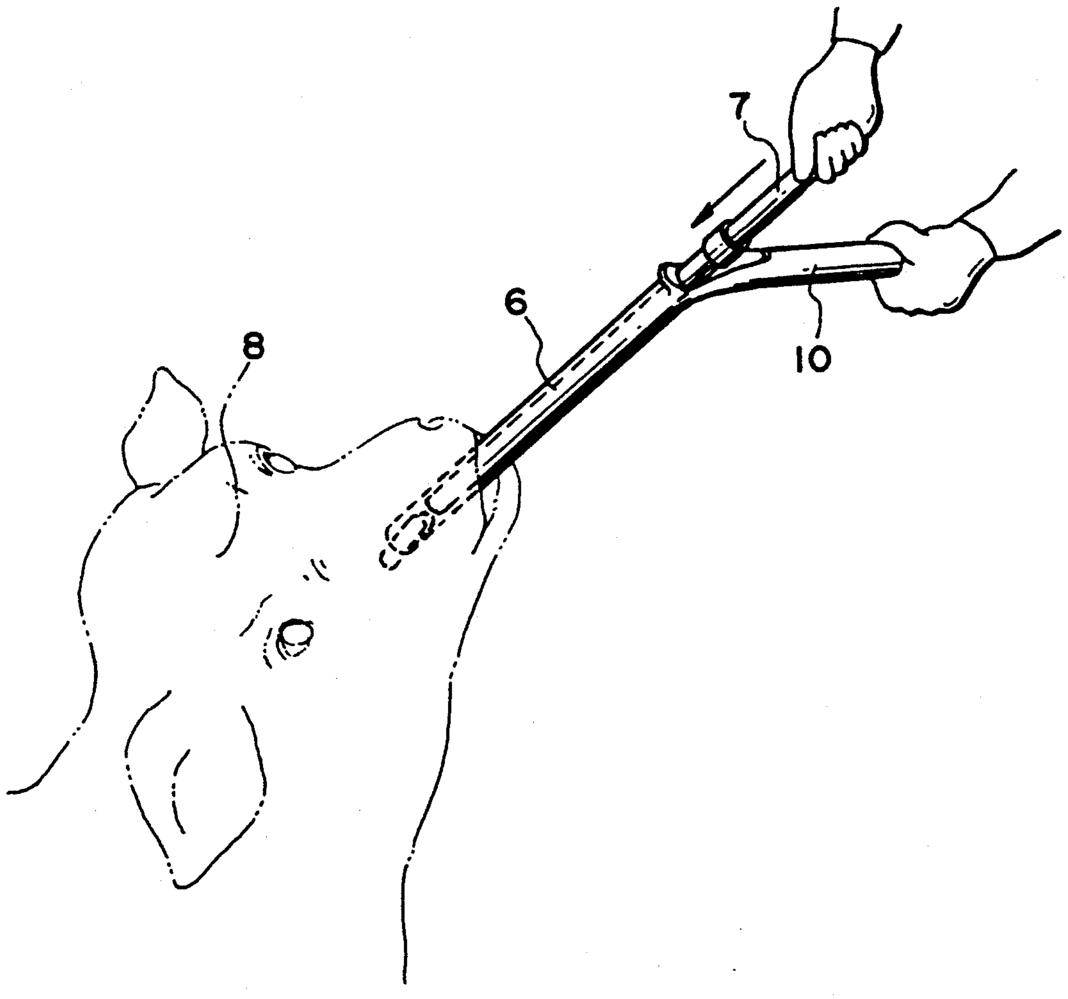
FIG. 8 shows the manner in which the apparatus of this invention is used.

In order for admitting the capsule 5 with the bunch of slender pieces into the stomach of the cattle, a tube 6 as shown in FIG. 7 is used. The tube 6 is inserted into the mouth of the cattle 8 while holding a grip 10 with hands until a curved leading end 11 reaches the wall of the throat as illustrated in FIG. 8. Then, the gastric resident object 1 is inserted into the tube 6 and thrust forward with a push rod 7 to fall into the throat through an opening 12 formed in the leading end portion of the tube 6. Thus, the cattle is forced to swallow the gastric resident object 1.

According to the method noted above, the gastric resident object 1 can be infallibly admitted into the rumen of the cattle without inflicting any injury to the wall of the throat. With the lapse of time after the gastric resident object 1 reaches the rumen, the wrapping member 4 or capsule 5 per se or the glued joint part of the wrapping member 4 is being dissolved or removed to thereby allow the wrapped bunch of slender piece 3 of synthetic resin to elastically spread and resume the original shape of a large diameter. The gastric resident object 1 moves freely in the rumen with movement of the rumen, while imparting stimulus to the mucous membrane of the rumen, particularly, the sophageal orifice portion, consequently to provoke the stomach to rumination. Since the gastric resident object 1 has the outer diameter sufficient to prevent its backward movement to the gullet through the sophageal orifice and its forward movement to the psalterium, the gastric resident object 1 would permanently stay in the rumen while imparting stimulus to the rumen.

The gastric resident object 1 staying in the rumen moves with the feed the cattle have eaten. In the case that the gastric resident object 1 is too light, it will disadvantageously float on the feed in the rumen. On the contrary, the gastric resident object 1 which is too heavy entails a disadvantage such that it sinks to the bottom of the rumen. Accordingly, in order to appropriately move the gastric resident object 1 in the rumen with the feed, it is desirable to provide the gastric resident object 1 with a weight somewhat smaller than or substantially equal to the feed.

From the results of the experiments using the cattle with a fistula (inspection window of glass), it has been confirmed that the gastric resident object 1 as described above moved uniformly around in the rumen, and the capsule 5 was dissolved and disappeared completely six house after being admitted into the rumen. The results of the observation on change in property of gastric juice secreted from the rumen of the fattening cattle are shown in TABLE 1 below.

TABLE 1

| | | FEED CONTENTS (Weight per day: kg) | | | | | | | | | | | |
|---|---|---|---|---|---|---|---|---|---|---|---|---|---|
| | | EXPERIMENTAL PERIOD | | | | | | | | | | | |
| | | Contrast period Oct. 1-Oct. 20 | | | | Feed suspension period Oct. 21-Nov. 11 | | | | Test period (five resident object admitted) Nov. 12-Jan. 1 | | | |
| CATTLE NO. | | 1 | 2 | 3 | * | 1 | 2 | 3 | * | 1 | 2 | 3 | * |
| Mixed Feed | | 5 | 5 | 5 | 5 | 5 | 5 | 5 | 5 | 5 | 5 | 5 | 5 |
| Barley | | 1 | 1 | 1 | 1 | 1 | 1 | 1 | 1 | 1 | 1 | 1 | 1 |
| Wheat bran | | 1 | 1 | 1 | 1 | 1 | 1 | 1 | 1 | 2 | 2 | 2 | 2 |
| Whiskey lees | | 4 | 4 | 4 | 4 | 4 | 4 | 4 | 4 | 8 | 8 | 8 | 8 |
| Beet pulp | | 1 | 1.5 | 2 | 1.5 | 2 | 2 | 2 | 2 | 2 | 2 | 2 | 2 |
| Hay cube | | 1 | 1.5 | 2 | 1.5 | 0 | 0 | 0 | 0 | 0 | 0 | 0 | 0 |
| Paddy straw | | 1.5 | 1.5 | 1.5 | 1.5 | 0 | 0 | 0 | 0 | 0 | 0 | 0 | 0 |
| | | GASTRIC JUICE IN THE RUMEN | | | | | | | | | | | |
| | pH | 6.7 | 6.8 | 6.6 | 6.7 | 6.0 | 6.2 | 6.6 | 6.06 | 6.5 | 6.6 | 6.5 | 6.53 |
| Divi- | VFA C2 | 62% | 61% | 63% | 62% | 47% | 44% | 45% | 45.3% | 49% | 54% | 56% | 53% |
| sion | VFA C3 | 25 | 23 | 26 | 24.7 | 28 | 28 | 29 | 28.3 | 29 | 31 | 31 | 30.3 |
| | VFA C4 | 10 | 14 | 9 | 11 | 15 | 16 | 14 | 5 | 14 | 11 | 11 | 12 |
| | Others | 3 | 2 | 2 | 2.3 | 10 | 12 | 13 | 11.3 | 8 | 4 | 2 | 4.7 |

(Mark * in the item "CATTLE NO." represents the average cattle.)

In the experiments actually conducted, the observation period was divided into three experimental periods by three weeks, i.e. the contrast period in which fibrous feed (paddy straw having more than a fixed length) is applied to the cattle, the feed suspension period in which the application of fibrous feed is suspended, and the test period in which the gastric resident object is admitted into the rumen. As is evident from TABLE 1, the gastric resident object is shown to function as a substitute for the physical properties of the fibrous feed in the division of low volatile fatty acid during the test period. Furthermore, even after the lapse of six months from the end of the test period in which the gastric resident object is applied, the mucous saliva and villi tissue of the rumen were in no means changed in function and were kept healthy.

The experiments the results of which are presented in TABLE 1 were conducted under the following conditions.

1. The gastric juice was gathered from the rumen of each cattle and measured on the last day of each experimental period.

2. In the second experimental period (feed suspension period), the application of fibrous feed of over 25 mm in cut length was suspended, and instead, fine grain beet pulp in the fibrous feed is increased in quantity.

3. In the third experimental period (test period), the amount of whiskey lees applied was two times as usual.

4. In the third experimental period (test period), the values of pH and VFA were recovered by using the gastric resident object according to this invention, but acetic acid C2 was insufficient. However, since propionic acid C3 was increased, it can be considered that the fattening efficiency was improved.

Though the above experiments were conducted with fattening cattle, for lactating cattle there is recommended a method of ensure the yielding rate of acetic acid C2.

Upon completion of the experiments noted above, further observations were made by fattening up ten or more Postpartum cattle having the mean weight of 550 kg. In the successive experiments, the cattle were divided into three groups and continuously observed for six to seven months in which the cattle were brought up to 700 to 750 kg in weight.

All the groups of cattle were not supplied with dry paddy straw except for ordinary feed, and instead, given five gastric resident objects 1. Consequently, the desired fleshy-grown cattle could be obtained. The amount of excrement was reduced by about 10%.

The number of the gastric resident objects to be admitted into the cattle rumen should selectively be two to ten. However, three to five gastric resident objects may be preferably used from the standpoint of cost.

As is clear from the foregoing explanation, according to this invention, the gastric resident object includes elastic stimulus members which are wrapped to a small diameter with the wrapping member soluble, or separable so as to allow the stimulus members to be expanded in the stomach. This gastric resident object is admitted into the rumen of the cattle, the work of feeding cattle such that can be effectively carried out with ease in a mechanized manner. Moreover, the ruminant-raising apparatus comprising the aforenoted gastric resident object can be substituted for fibrous roughage to thereby decrease the excretion of the cattle. As a result, the cost for dealing with the excretion can be curtailed an cost for feeding for the cattle can be kept down. Additionally, the gastric resident object of this invention is very simple in structure and therefore can be produced at a low price.

As many apparently widely different embodiments of this invention may be made without departing from the spirit and scope thereof, it is to be understood that the invention is not limited to the specific embodiments thereof except as defined in the appended claims.

What is claimed is:

1. A method for raising ruminants, which comprises the steps of positioning in the stomach of a ruminant at least one gastric resident object having a small diameter before being admitted to the stomach, said at least one gastric resident object having a body member and a plurality of elastic stimulus members secured so as to extend radially outward from said body member at and between the ends along the length thereof, wherein said plurality of elastic stimulus members are initially wrapped to a small diameter and are expansible in the stomach so as to prevent said at least one gastric resident object from being discharged from the stomach, said at least one gastric resident object being admitted into the stomach such that said plurality of elastic stimulus members will give stimulus to the walls of the stomach along the length of said body member as said at least one resident object moves about in the stomach.

2. The method according to claim 1 wherein two to ten of said gastric resident objects are admitted into the stomach of said ruminant.

3. An apparatus for raising ruminants and stimulating the rumen thereof, comprising a gastric resident object having a body member and a plurality of elastic stimulus members which are secured at and between the ends along the length of said body member so as to extend radially outward from said body member along the length thereof, said plurality of elastic stimulus members being initially wrapped to a small diameter by means of a separable wrapping member, which releases said plurality of elastic stimulus members in the stomach of the ruminant so as to allow said plurality of stimulus members to be expanded to a larger diameter along the length of said resident object.

4. The apparatus according to claim 3, wherein said elastic stimulus members are slender pieces of synthetic resin material which are bunched by a tying wire which is folded double so as to nip said slender pieces therebetween, said typing wire forming a central axis of said resident object such that said slender pieces extend radially from said central axis along the length of said doubled wire.

5. The apparatus according to claim 3 wherein said wrapping member is formed of paper in a cylindrical shape of a small diameter.

6. The apparatus according to claim 3 further comprising a tube to be inserted into the ruminant mouth for forcing the ruminant to swallow said gastric resident object, and a push rod for thrusting forward said gastric resident object in said tube, said tube being provided at its leading end portion with a opening.

* * * * *